United States Patent [19]

Horton

[11] Patent Number: 4,463,620

[45] Date of Patent: Aug. 7, 1984

[54] INFINITELY VARIABLE TRACTION ROLLER TRANSMISSION

[75] Inventor: Paul L. Horton, Austin, Tex.

[73] Assignee: Excelermatic Inc., Austin, Tex.

[21] Appl. No.: 415,319

[22] Filed: Sep. 7, 1982

[51] Int. Cl.³ .................... F16H 15/08; F16H 53/00; F16H 15/00

[52] U.S. Cl. ........................ 74/200; 74/567; 74/190

[58] Field of Search ............ 74/199, 200, 201, 190.5, 74/190, 198, 567

[56] References Cited

U.S. PATENT DOCUMENTS

| | | | |
|---|---|---|---|
| 1,666,893 | 4/1928 | Garrard | 74/567 |
| 2,796,487 | 6/1957 | Dehn | 74/567 |
| 3,087,348 | 4/1963 | Kraus | 74/200 |
| 3,184,983 | 5/1965 | Kraus | 74/200 |
| 4,086,820 | 5/1978 | Kraus et al. | 74/200 |

*Primary Examiner*—Lawrence J. Staab
*Assistant Examiner*—Michael Bednarek
*Attorney, Agent, or Firm*—Klaus J. Bach

[57] ABSTRACT

In a traction roller transmission having toric discs mounted opposite each other on its input and output shafts motion transmitting traction rollers are engaged between the toric discs and supported by pivotal roller support structures permitting adjustment of the ratio of motion transmission between the input and output shafts. A cam structure is arranged adjacent a toric disc to provide an axial contact force depending on the torque transmitted through the transmission, the cam structure having cam areas with different leads, the cam leads adjacent the cam crests being larger than those of the cam surfaces adjacent the cam low points so as to reduce the contact forces provided by the cam structure when the cam areas with large lead are utilized during high transmission ratio pivot positions of the traction rollers.

4 Claims, 3 Drawing Figures

INFINITELY VARIABLE TRACTION ROLLER TRANSMISSION

BACKGROUND OF THE INVENTION

The invention relates to an infinitely variable traction roller transmission in which motion is transmitted from an input toric disc to an output toric disc through traction rollers pivotally supported between the toric discs, the discs being forced toward each other for engagement with the traction rollers therebetween.

Generally, the engagement forces are obtained by an axial cam structure which provides for an axial force dependent on the torque transmitted through the transmission. Such an arrangement is shown, for example, in U.S. Pat. No. 4,086,820, which is assigned to the assignee of the present application.

It has been found however that, in a high speed reduction mode, the cam structure produces contact forces far in excess of what is needed for slip-free power transmission since the traction rollers are then in engagement with the radially inner area of the input toric disc which, in this position, is wedged between the rollers by the axial forces. The angle of contact at this point—with respect to the axis of the toric disc—is an acute angle $\alpha$ so that the contact force Fc is substantially larger than the part of the axial cam force $Fa_1$ generating the particular contact force, that is, $$Fc = Fa_1/\sin \alpha.$$

If $\alpha$ is, for example, 30° then $$Fc = Fa_1/\tfrac{1}{2} = 2Fa_1;$$

that is, the contact force is twice the corresponding cam force. Accordingly, greater contact forces than needed are generated, resulting in greater than necessary wear and friction, and furthermore in outward deflection of the traction roller support structures and also in excessive cam lift and possible jumping of the cam rollers over the cam crests.

SUMMARY OF THE INVENTION

In a traction roller transmission in which toric traction discs are mounted opposite each other on input and output shafts with motion transmitting traction rollers pivotally supported between, and in engagement with, the toric discs so as to permit adjustment of the ratio of motion transmission between the input and output toric discs, a cam structure is arranged adjacent a toric disc to provide an axial contact force depending on the torque transmitted through the transmission. The cam structure has cam surface areas with different leads, the cam leads adjacent the cam crests being larger than those of the remainder of the cam surfaces so as to reduce the contact force provided by the cam structure when the cam areas with large leads are utilized during high transmission ratio pivot positions of the traction rollers.

SHORT DESCRIPTION OF THE DRAWINGS

DESCRIPTION OF THE PREFERRED EMBODIMENT

Figure 1:
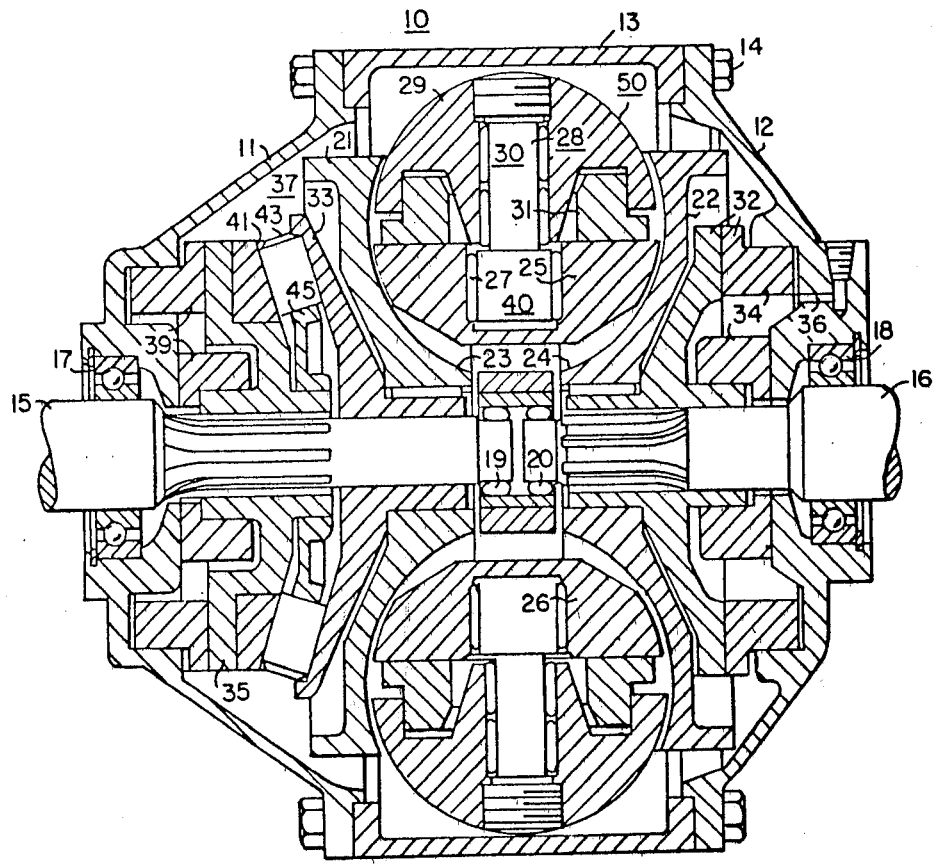
FIG. 1 is a cross-sectional view of a traction roller transmission.

As shown in FIG. 1, the traction roller transmission comprises a housing 10 consisting of a central part 13, a front part 11 disposed at one end of the central part and a rear part 12 disposed at the opposite end of the central part 13. The housing parts 11, 12 and 13 are held together by bolts 14. Coaxial input and output shafts 15 and 16 extend through the front and the rear parts 11 and 12 of the housing 10 and are rotatably supported by input and output shaft bearings 17 and 18 and by central support bearings 19 and 20 or, alternatively, one shaft may extend into a central bore in the other shaft to be supported therein.

The input shaft 15 carries an input traction disc 21 and the output shaft 16 carries an output traction disc 22 disposed opposite the input traction disc 21. The traction discs 21 and 22 have opposite toroidal surfaces 23 and 24 and are adapted to engage therebetween traction rollers 25 and 26 for the transmission of motion from the input traction disc to the output traction disc. The traction rollers 25 and 26 are supported by bearings 27 on a shaft 28 journalled in a roller support structure 29. The shaft 28 has slightly eccentric bearing portions 30 and 40 to permit some translation of the rollers when necessary for firm engagement with the input and output traction discs. Axial support is provided for the traction rollers 25 and 26 by axial thrust bearings and seal assemblies 31.

The output traction disc 22 is mounted on an axial output thrust member 32 supported on the output shaft 16 for rotation therewith. A hydrostatic axial thrust bearing and seal structure 34 is disposed between the axial thrust member 32 and the housing part 12 to provide axial support for the thrust member 32 and the output traction disc 22.

The input traction disc 21 is mounted on an axial input thrust member 33 which is freely rotatable on the input shaft 15 and, together with an axial pressure plate 35, forms a load cam structure 37 for forcing the input traction disc 21 toward the output traction disc 22 and both discs into firm engagement with the traction rollers 25 and 26 when a torque is transmitted through the transmission. The cam structure 37 has cams 41 formed on the pressure plate 35 and cam faces or simply thrust surfaces may be provided on the thrust member 33 with cam rollers 43 disposed between the thrust member 33 and the cams 41 to be wedged therebetween when a torque is applied to the input shaft. The rollers 43 are held in position by a cage 45.

Figure 2:
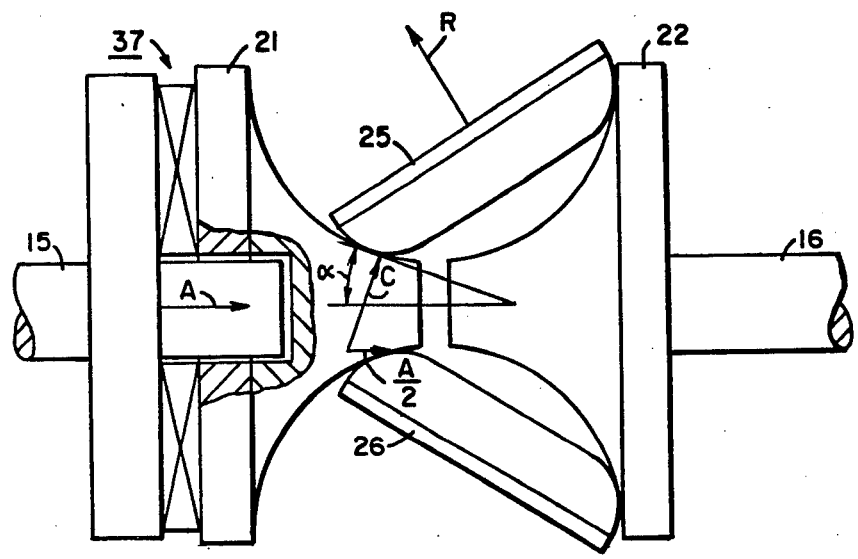
FIG. 2 shows schematically the traction rollers in a high transmission ratio position.

FIG. 2 shows schematically input and output toric discs 21 and 22 with the traction rollers 25 and 26 engaged therebetween in a high transmission ratio position to indicate the forces: the axial cam force A as generated by the cam structure 37 produces on each traction roller a contact force C which is normal to the roller surface in the contact area and which increases as the angle $\alpha$ between the tangential plane in the contact area and the toric disc axis decreases. With two traction rollers, the traction roller contact force C is $$C = A/2 \sin \alpha$$

which becomes very large as $\alpha$ becomes small during high transmission ratio pivot positions of the traction rollers 25 and 26. These large contact forces C generate large axial forces R on the traction rollers which are taken up by the traction roller support structures, however, not without deflection of the traction roller support structures. It is noted that not only are large contact forces generated by a predetermined axial force during large transmission ratio pivot positions of the traction rollers, but there is also a relatively large amount of axial travel necessary for the toric disc 21 to generate the contact forces since angle α is relatively small. Axial travel of the toric disc is even further increased by a certain resiliency of the traction roller support structures. A small angle α and resiliency of the roller support structure in combination may provide for such large axial cam lift that the cam rollers roll over the cam crests which results in failure of the transmission.

The contact forces generated with high transmission ratio pivot positions of the traction rollers are actually far in excess of what is necessary to transmit the desired torque and, being in excess of the required value, they generate only greater friction and cause faster wear of the traction surfaces.

Figure 3:
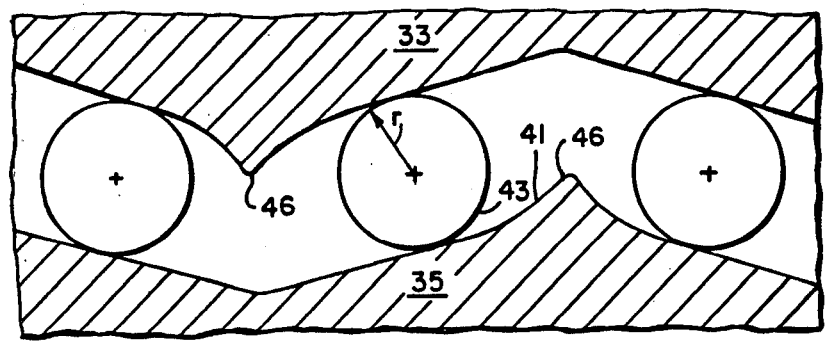
FIG. 3 shows a cam structure for providing a roller engagement force which is modified depending on the transmission ratio.

To eliminate this problem, the present invention provides a cam structure with varying lead, that is, with a cam lead which increases toward the cam crest 46. Such an arrangement is shown in FIG. 3. A cam roller 43 is shown disposed between the cam surface 41 and the surface of thrust member 33 which, in the arrangement of FIG. 3, is also provided with a cam surface corresponding to the cam surface 41.

During normal transmission ratio pivot positions of the traction rollers 25 and 26, that is, with about a 1:1 transmission ratio, the cam roller 43 is in a linear slope area of the cam structure which is so selected as to provide contact forces large enough to avoid slipping of the traction rollers. In high transmission ratio pivot positions where a relatively large cam lift is necessary because of a small angle α (FIG. 2), the cam surfaces with increased lead will come into contact with the cam roller 43 providing a reduced axial contact force and increased lift. However, the cam lead near these end positions is so selected that the contact forces at the traction rollers are still sufficiently large to prevent slippage.

If, as shown in FIG. 3, cam surfaces are provided at both sides of the cam structure, engagement forces are generated upon relative motion of the cam surfaces in either direction so that the transmission may be operated in either direction of rotation.

With this simple arrangement, the traction roller engagement forces cannot only be limited to the value necessary for firm engagement of the traction rollers with the toric discs, it is furthermore practically impossible for the cam rollers to roll over the cam crests so that failure will not occur already after a relatively small amount of wear has occurred. In fact, wear of the surfaces in engagement in high transmission ratio pivot positions will also be greatly reduced.

I claim:

1. An infinitely variable traction roller transmission comprising: coaxial input and output shafts; oppositely disposed toric traction discs, one being supported by each of said shafts, for rotation therewith; at least two motion transmitting traction rollers arranged in radial symmetry with respect to the axis of the input and output shafts and in engagement with said toric discs for the transmission of motion therebetween; a pivotal support structure for each of said traction rollers permitting a change of the ratio of motion transmission between the toric traction discs; and an axial cam structure disposed adjacent at least one of said toric traction discs for forcing said one toric traction disc toward the other so as to cause firm engagement of the traction rollers with the traction discs when a torque is transmitted through said transmission, said cam structure including cams having main operating surface areas with cam crests therebetween, said main operating surface areas having a lead so selected as to provide an axial contact force sufficient to cause firm engagement of said traction rollers with said toric discs during normal transmission ratios when the traction rollers axes are about normal to the axis of the toric traction discs and having areas with increased slopes adjacent the crests so as to provide for increased leads in the areas adjacent the crests thereby to reduce the axial contact force in high transmission ratio pivot positions of traction rollers.

2. An infinitely variable traction roller transmission as claimed in claim 1, wherein said cam structure includes antifriction bearing elements disposed to roll on said cam surfaces.

3. An infinitely variable traction roller transmission as claimed in claim 2, wherein said antifriction bearing elements are rollers and said cam surface areas with increased lead adjacent said crests are curved having a radius of curvature larger than the radius of said rollers.

4. An infinitely variable traction roller transmission as claimed in claim 1, wherein cam areas are arranged at opposite sides of said antifriction bearing elements.

* * * * *